United States Patent
Miyashita et al.

(12)

(10) Patent No.: US 6,478,007 B2
(45) Date of Patent: Nov. 12, 2002

(54) IN-CYLINDER-INJECTION INTERNAL COMBUSTION ENGINE AND METHOD OF CONTROLLING IN-CYLINDER-INJECTION INTERNAL COMBUSTION ENGINE

(75) Inventors: Shigeki Miyashita, Susono (JP); Takashi Tsunooka, Susono (JP); Toyokazu Baika, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/988,344

(22) Filed: Nov. 19, 2001

(65) Prior Publication Data

US 2002/0062813 A1 May 30, 2002

(30) Foreign Application Priority Data

Nov. 24, 2000 (JP) ........................................ 2000-358181

(51) Int. Cl.[7] ............................................... F02B 17/00
(52) U.S. Cl. ..................... 123/295; 123/447; 123/305; 123/179.16
(58) Field of Search ............................ 123/295, 305, 123/179.16, 447, 294, 445, 446, 179.17

(56) References Cited

U.S. PATENT DOCUMENTS 6,065,443 A * 5/2000 Mizuno et al. ............. 123/295
6,425,366 B1 * 7/2002 Ogawa et al. .............. 123/295

FOREIGN PATENT DOCUMENTS

| JP | 10-103117 A | 4/1998 |
| JP | 11-229926 A | 8/1999 |
| JP | 2000-80942 A | 3/2000 |

* cited by examiner

*Primary Examiner*—Bibhu Mohanty
(74) *Attorney, Agent, or Firm*—Oliff & Berridge, PLC

(57) ABSTRACT

An in-cylinder-injection internal combustion engine of spark ignition type has a plurality of cylinders, a fuel accumulator for storing a pressurized fuel; a fuel injector system that injects the pressurized fuel into each of the cylinders; a spark ignition system that ignites the fuel injected into each of the cylinders; and is controlled such that the engine is started by a partial operation of a selected at least one of the cylinders with a fuel injected into the selected at least one of the cylinders in at least its intake stroke. Then, a full operation of all of the cylinders with the fuel injected into all of the cylinders is started. The full operation is initiated not before a pressure of the fuel in the fuel accumulator has been raised to a level high enough to permit injection of the fuel into each of the cylinders in its compression stroke, as a result of the partial operation of the selected at least one of the cylinders. In addition, the engine is controlled such that an initial portion of the full operation includes a first mode of combustion in the selected at least one of the cylinders with the fuel injected thereinto in at least its intake stroke, the first mode of combustion being followed by stratified charge combustion in the selected at least one of the cylinders with the fuel injected thereinto in only its compression stroke.

20 Claims, 4 Drawing Sheets

IN-CYLINDER-INJECTION INTERNAL COMBUSTION ENGINE AND METHOD OF CONTROLLING IN-CYLINDER-INJECTION INTERNAL COMBUSTION ENGINE

INCORPORATION BY REFERENCE

The disclosure of Japanese Patent Application No. 2000-358181 filed on Nov. 24, 2000, including the specification, drawings and abstract is incorporated herein by reference in its entirety.

BACKGROUND OF THE INVENTION

1. Field of Invention

The present invention relates to in-cylinder-injection internal combustion engines of the spark ignition type, and to methods of controlling such internal combustion engines.

2. Description of Related Art

JP-A-2000-80942 discloses an in-cylinder-injection internal combustion engine which has a fuel injector valve for each of its cylinders and which is started with a partial operation of a selected one or more of the cylinders with fuel injection into only the selected cylinder or cylinders, for reducing a total amount of an unburned fuel discharged from the cylinders. In this in-cylinder-injection internal combustion engine of spark ignition type, the high pressurized fuel supplied from a fuel accumulator is injected through the fuel injector valve into each cylinder in the latter half or a relatively terminal portion of the compression stroke, in which the pressure within the cylinder is relatively high.

After the engine is started in the manner described above, a pressurizing pump used to pressurize the fuel within the fuel accumulator can be operated by the started engine with a comparatively high degree of stability, so that the fuel within the fuel accumulator can be suitably pressurized so as to permit the fuel injection into the cylinders in their compression stroke. Accordingly, a full operation of the engine with the fuel injection into all of the cylinders can be subsequently performed, with stratified charge combustion which is advantageous for reducing the amount of consumption of the fuel.

In the selected cylinder or cylinders in which uniform charge combustion is effected for starting the engine, a portion of the fuel injected therein in the intake stroke remains on the cylinder bore surface and/or the top surface of the piston. Upon initiation of the full operation of the engine with the fuel injection into all of the cylinders, a part of the fuel remaining on the cylinder and/or piston surface or surfaces evaporates to form a very fuel-lean air-fuel mixture in the peripheral portion of the cylinder. Although a portion of the combustible air-fuel mixture in the vicinity of a spark plug can be comparatively well ignited, a flame produced by the ignition does not propagate to the fuel-lean air-fuel mixture in the peripheral portion of the cylinder. As a result, this fuel-lean air-fuel mixture is discharged out of the cylinder, undesirably causing a considerable increase of the amount of the unburned fuel to be discharged from the cylinder.

In the other or non-selected cylinder or cylinders not supplied with the fuel during the partial engine operation with the fuel injection into the selected cylinder or cylinders, the air-fuel mixture can be ignited with high stability, with the stratified charge combustion, in the subsequent full engine operation with the fuel injection into all of the cylinders. On the other hand, however, the non-selected cylinder or cylinders tends/tend to produce a comparatively large amount of smoke due to incomplete combustion since the temperature in the non-selected cylinder or cylinders is lower than that in the selected cylinder or cylinders. Thus, the overall exhaust emission of the engine is deteriorated when the full engine operation is initiated following the partial engine operation with the fuel injection into only the selected cylinder or cylinders.

SUMMARY OF THE INVENTION

It is therefore an object of the present invention to improve an exhaust emission produced by an in-cylinder-injection internal combustion engine of spark ignition type upon initiation of a full operation of the engine with fuel injection into all of its cylinders after fuel pressure within a fuel accumulator is raised to a level permitting the fuel injection into each cylinder in the compression stroke, as a result of a partial engine operation with the fuel injection into only a selected one or more of the cylinders, and to reduce the amount of consumption of the fuel in the full operation of the engine.

According to a first aspect of this invention, there is provided an in-cylinder-internal internal combustion engine of spark ignition type which has a plurality of cylinders and which is started by a partial operation of a selected at least one of the cylinders with a fuel injected into the selected at least one of the cylinders in at least its intake stroke. The partial operation is followed by a full operation of all of the cylinders with the fuel injected into all of the cylinders. The full operation is initiated when or after (i.e., not before) a pressure of the fuel in a fuel accumulator has been raised to a level high enough to permit injection of the fuel into each of the cylinders in its compression stroke, as a result of the partial operation of the selected at least one of the cylinders. In addition, an initial portion of the full operation of all of the cylinders includes a first mode of combustion in the selected at least one of the cylinders with the fuel injected thereinto in at least its intake stroke, the first mode of combustion being followed by stratified charge combustion in the selected at least one of the cylinders with the fuel injected thereinto in only the compression stroke.

According to a second aspect of the invention, there is provided an in-cylinder-injection internal combustion engine of spark ignition type which has a plurality of cylinders and which is started by a partial operation of a selected at least one of the cylinders with a fuel injected into the selected at least one of the cylinders in at least its intake stroke. The partial operation is followed by a full operation of all of the cylinders with the fuel injected into all of the cylinders. The full operation is initiated when or after (i.e., not before) a pressure of the fuel in a fuel accumulator has been raised to a level high enough to permit injection of the fuel into each of the cylinders in its compression stroke, as a result of the partial operation of the selected at least one of the cylinders. In addition, an initial portion of the full operation of all of the cylinders includes a first mode of combustion in each of the other of the plurality of cylinders (i.e., each of the cylinders other than the selected cylinder (s)) with the fuel injected thereinto in at least its intake stroke, the first mode of combustion being followed by stratified charge combustion in each of the other cylinder(s) with the fuel injected thereinto in only its compression stroke.

According to a third aspect of the present invention, there is provided an in-cylinder-injection internal combustion engine of spark ignition type which has a plurality of cylinders and which is started by a partial operation of a selected at least one of the cylinders with a fuel injected into the selected at least one of the cylinders in at least its intake stroke. The partial operation is followed by a full operation of all of the cylinders with the fuel injected into all of the cylinders. The full operation is initiated when or after (i.e., not before) a pressure of the fuel in an accumulator has been raised to a level high enough to permit injection of the fuel into each of the cylinders in its compression stroke, as a result of the partial operation of the selected at least one of the cylinders. In addition, an initial portion of the full operation of all of the cylinders includes a first mode of combustion with the fuel injected into full of the cylinders in at least its intake stroke, the first mode of combustion being followed by stratified charge combustion with the fuel injected into full of the cylinders in only its compression stroke, and furthermore, the stratified charge combustion in the selected at least one of the cylinders is initiated before that in each of the other cylinder(s).

According to a fourth aspect of this invention, there is provided a method of controlling an in-cylinder-injection internal combustion engine of spark ignition type having a plurality of cylinders, comprising: a step of starting the engine by a partial operation of a selected at least one of the plurality of cylinders with a fuel injected into the selected cylinder(s) in at least its intake stroke; a step of initiating a full operation of all of the cylinders with the fuel injected into all of the cylinders, when or after (i.e., not before) a pressure of the fuel in a fuel accumulator has been raised to a level high enough to permit injection of the fuel into each of the cylinders in its compression stroke, as a result of the partial operation of the selected cylinder(s); and a step of controlling the full operation of all of the cylinders such that an initial portion of the full operation includes a first mode of combustion in the selected cylinder(s) with the fuel injected thereinto in at least its intake stroke, the first mode of combustion being followed by stratified charge combustion in the selected cylinder(s) with the fuel injected thereinto in only the compression stroke.

According to a fifth aspect of this invention, there is provided a method of controlling an in-cylinder-injection internal combustion engine of spark ignition type having a plurality of cylinders, comprising: a step of starting the engine by a partial operation of a selected at least one of the cylinders with a fuel injected into the selected cylinder(s) in at least its intake stroke; a step of initiating a full operation of all of the cylinders with the fuel injected into all of the cylinders, when or after (i.e., not before) a pressure of the fuel in a fuel accumulator has been raised to a level high enough to permit injection of the fuel into each of the cylinders in its compression stroke, as a result of the partial operation of the selected cylinder(s); and a step of controlling the full operation of all of the cylinders such that an initial portion of the full operation includes a first mode of combustion in each of the other of the plurality of cylinders (i.e., the non-selected cylinder or cylinders) with the fuel injected thereinto in at least its intake stroke, the first mode of combustion being followed by stratified charge combustion in each of the other cylinder(s) with the fuel injected thereinto in only its compression stroke.

According to a sixth aspect of this invention, there is provided a method of controlling an in-cylinder-injection internal combustion engine of spark ignition type having a plurality of cylinders, comprising: a step of starting the engine by a partial operation of a selected at least one of the cylinders with a fuel injected into the selected cylinder(s) in at least its intake stroke; a step of initiating a full operation of all of the cylinders with the fuel injected into all of the cylinders, which full operation is initiated when or after (i.e., not before) a pressure of the fuel in a fuel accumulator has been raised to a level high enough to permit injection of the fuel into each of the cylinders in its compression stroke, as a result of the partial operation of the selected cylinder(s); and a step of controlling the full operation of all of the cylinders such that an initial portion of the full operation includes a first mode of combustion with the fuel injected into full of the cylinders in at least its intake stroke, the first mode of combustion being followed by stratified charge combustion with the fuel injected into full of the cylinders in only its compression stroke, wherein the stratified charge combustion in the selected cylinder(s) is initiated earlier than in each of the other (i.e., the non-selected) cylinder(s).

BRIEF DESCRIPTION OF THE DRAWINGS

The above and other objects, features, advantages and technical and industrial significance of the present invention will be better understood by reading the following detailed description of an exemplary preferred embodiment of the invention, when considered in connection with the accompanying drawings in which.

DETAILED DESCRIPTION OF PREFERRED EMBODIMENTS

Figure 1:
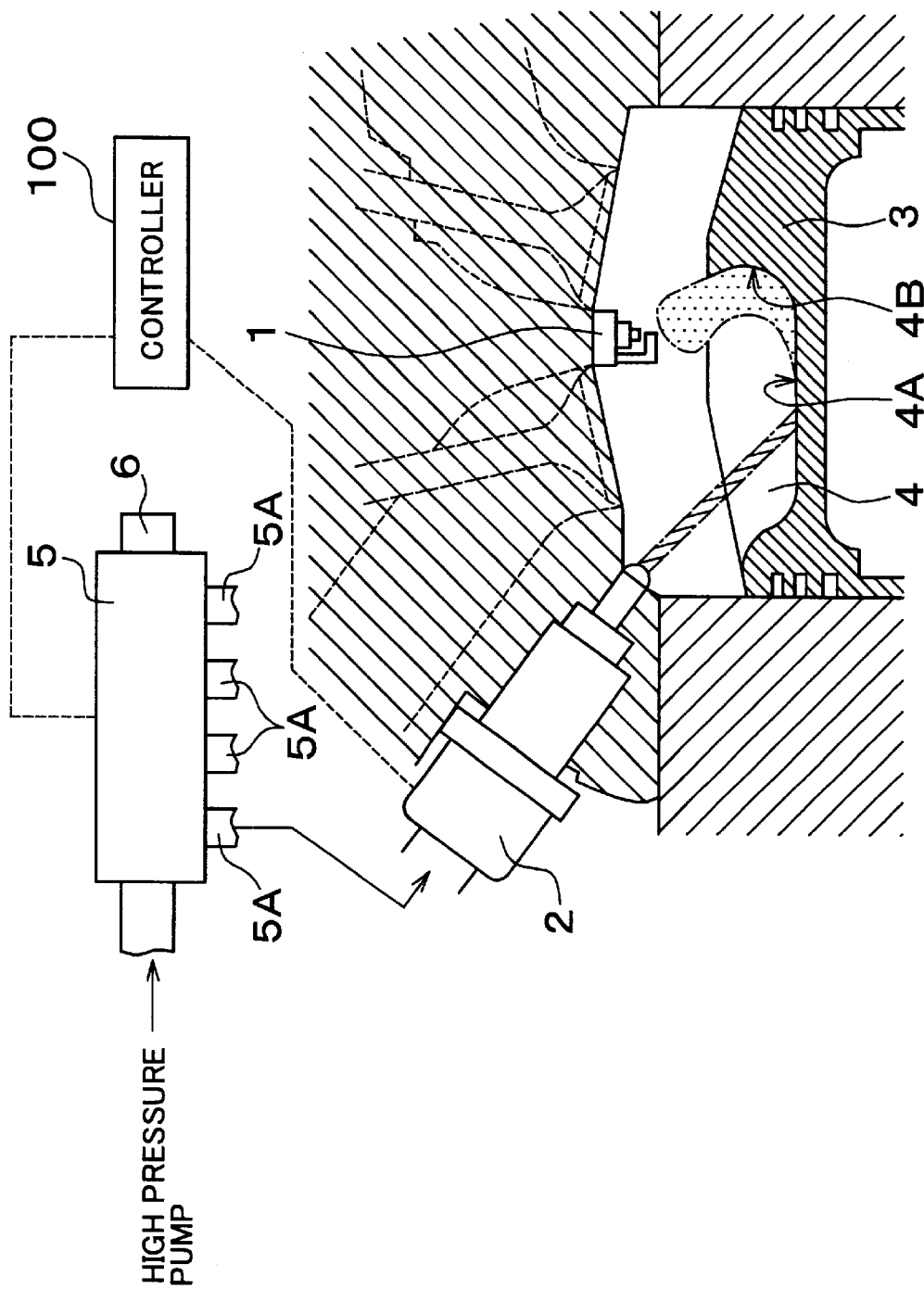
FIG. 1 is a fragmentary elevational view in vertical cross section schematically showing an in-cylinder-injection internal combustion engine of spark ignition type to which the present invention is applicable.
Figure 2:
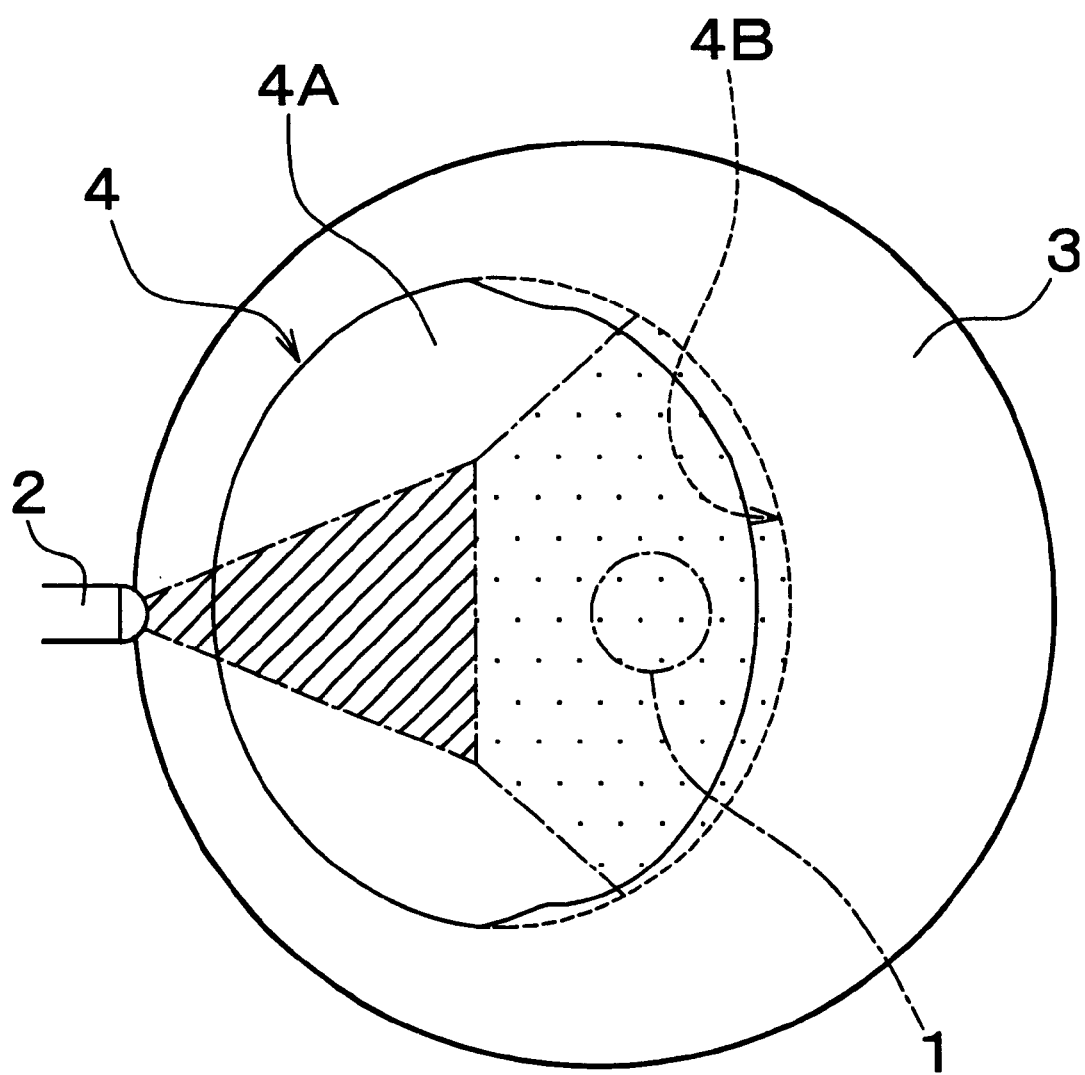
FIG. 2 is a top plan view of a piston of the in-cylinder-injection internal combustion engine of spark ignition type of FIG. 1.

Referring to FIGS. 1 and 2, a spark plug 1 is disposed in an almost central portion of an upper surface of each of a plurality of cylinders of an in-cylinder-injection internal combustion engine of spark ignition type. The upper surface of the cylinder cooperates with the head of a piston 3 to define a combustion chamber. The top surface of the head of the piston 3 has a recess or cavity 4. To inject a fuel directly into the combustion chamber of each cylinder, a fuel injector valve 2 is disposed such that the valve 2 injects a fuel into the combustion chamber, and at the periphery of the combustion chamber. For preventing evaporation of the fuel, the fuel injector valve 2 is disposed on the intake side of the cylinder on which the temperature is kept comparatively low due to intake air flowing into the combustion chamber through an intake port.

A nozzle of the fuel injector valve 2 has an injecting end with an outlet opening which is rectangular in transverse cross section (i.e., slit shape), so that the fuel injected through the outlet opening takes the form of a sectorial layer (it is fan- or wedge-shaped) having a relatively small thickness, as illustrated in FIG. 2. To achieve stratified charge combustion, the fuel is injected through the injector valve 2 into the cavity 4 formed in the top surface of the piston 3, when the piston 3 is in the latter half of its compression stroke, as indicated in FIG. 1. An injected mass of the fuel, which is in a liquid state immediately after the injection, flows on a bottom surface 4A of the cavity 4 and expands in the direction of width of the sector (in the direction perpendicular to the direction of injection of the fuel), while absorbing heat from a relatively large area of the bottom wall 4A, so that the initially liquid fuel mass easily evaporates. The injected fuel mass in the process of evaporation is deflected upwards by an upright side wall 4B of the cavity 4, which side wall 4B is substantially opposed to the outlet of the fuel injector valve 2.

As shown in FIG. 2, the side wall 4B has an arcuate shape in transverse cross section of the piston head (in the plane of the top plan view of FIG. 2). The fuel mass in the process of evaporation while flowing on the bottom surface 4A of the cavity 4 and along the upright arcuate side wall 4B eventually gathers at a radially central portion of the combustion chamber, due to an effect of the arcuate shape of the side wall 4B, so that a combustible air-fuel mixture is formed near the spark plug 1. The stratified charge combustion is effected within the combustion chamber by ignition of the combustible air-fuel mixture.

The present in-cylinder-injection internal combustion engine of spark ignition type is capable of effecting not only the stratified charge combustion in which a required amount of fuel is injected into each cylinder in its compression stroke only, but also uniform charge combustion in which the required amount of fuel is injected into the cylinder in its intake stroke only. In the uniform charge combustion, a uniform air-fuel mixture is formed in the combustion chamber, and is ignited by a spark. Unlike the stratified charge combustion in which the fuel is injected into the cylinder in the latter half of its compression stroke, the uniform charge combustion permits a comparatively large amount of fuel injection into each cylinder, and is effected usually when the engine is required to operate at a relatively high speed under a relatively high load. The present in-cylinder-injection internal combustion engine of spark ignition type is also capable of semi-stratified charge combustion in which a portion of the required amount of fuel is injected into the cylinder in its intake stroke, for thereby forming a relatively fuel-lean air-fuel mixture within the combustion chamber, and the remaining portion of the required amount is subsequently injected into the cylinder in its compression stroke, so that a highly ignitable or combustible mass of the air-fuel mixture is formed in the vicinity of the spark plug 1, and is ignited with a spark generated by the spark plug 1. A flame produced as a result of ignition of the highly ignitable air-fuel mass propagates to a uniform mass of the air-fuel mixture. This semi-stratified charge combustion enables the engine to provide a larger output than the pure stratified charge combustion discussed above.

As shown in FIG. 1, the fuel injector valve 2 for each cylinder is connected through a fuel pipe 5a to a fuel accumulator 5 in which the fuel is stored under pressure, so that the fuel injector valve 2 can inject the pressurized fuel into the combustion chamber in the latter half of the compression stroke, for the stratified charge combustion. The fuel in the fuel accumulator 5 is pressurized by a high-pressure pump, which is generally driven by the internal combustion engine. For instance, the high-pressure pump is operated to feed the fuel accumulator 5 with the pressurizing fuel having a predetermined pressure, each time the fuel has been injected by the fuel injector valve 2 into the two successively operated cylinders, such that an amount of the fuel to be fed into the fuel accumulator 5 is equal to the amount of the fuel that has been injected into the two cylinders. Alternatively, the high-pressure pump is operated to feed the fuel accumulator 5 with a predetermined amount of the pressurized fuel, each time the fuel has been injected by the fuel injector valve 2 into the two successively operated cylinder. In this case, the fuel accumulator 5 is provided with a pressure-relief valve (not shown), so that the pressurized fluid is discharged from the accumulator 5 back to a fuel tank through the pressure-relief valve when the pressure of the fluid within the fuel accumulator 5 exceeds a predetermined level. (That is, a fuel that exceeds a necessary amount returns to the fuel tank.) In either of these two cases, a normal operation of the high-pressure pump maintains the pressure of the pressurized fuel within the accumulator 5 at or near the predetermined relatively high level. A pressure sensor 6 is provided to monitor the fuel pressure within the fuel accumulator 5. An electrically operated low-pressure pump (not shown) is disposed in series with the high-pressure pump. The delivery pressure of the low-pressure pump is only slightly higher than the atmospheric pressure and is lower than that of the high-pressure pump. As described below, the low-pressure pump is operated when the engine is started.

As described above, the pressurized fuel within the fuel accumulator 5 is maintained at a predetermined elevated pressure during operation of the internal combustion engine. If the high-pressure pump is turned off with the engine kept at rest for a relatively long time, the pressure of the fuel in the accumulator 5 is gradually reduced due to fuel leakage through the high-pressure pump and the related components and eventually reaches the atmospheric level. In this respect, it is noted that the pressure of the fuel pressurized by the low-pressure pump and stored in the accumulator 5 is not high enough to permit the fuel injection into each cylinder in its compression stroke. Accordingly, the present internal combustion engine is started with the uniform charge combustion.

Figure 3:
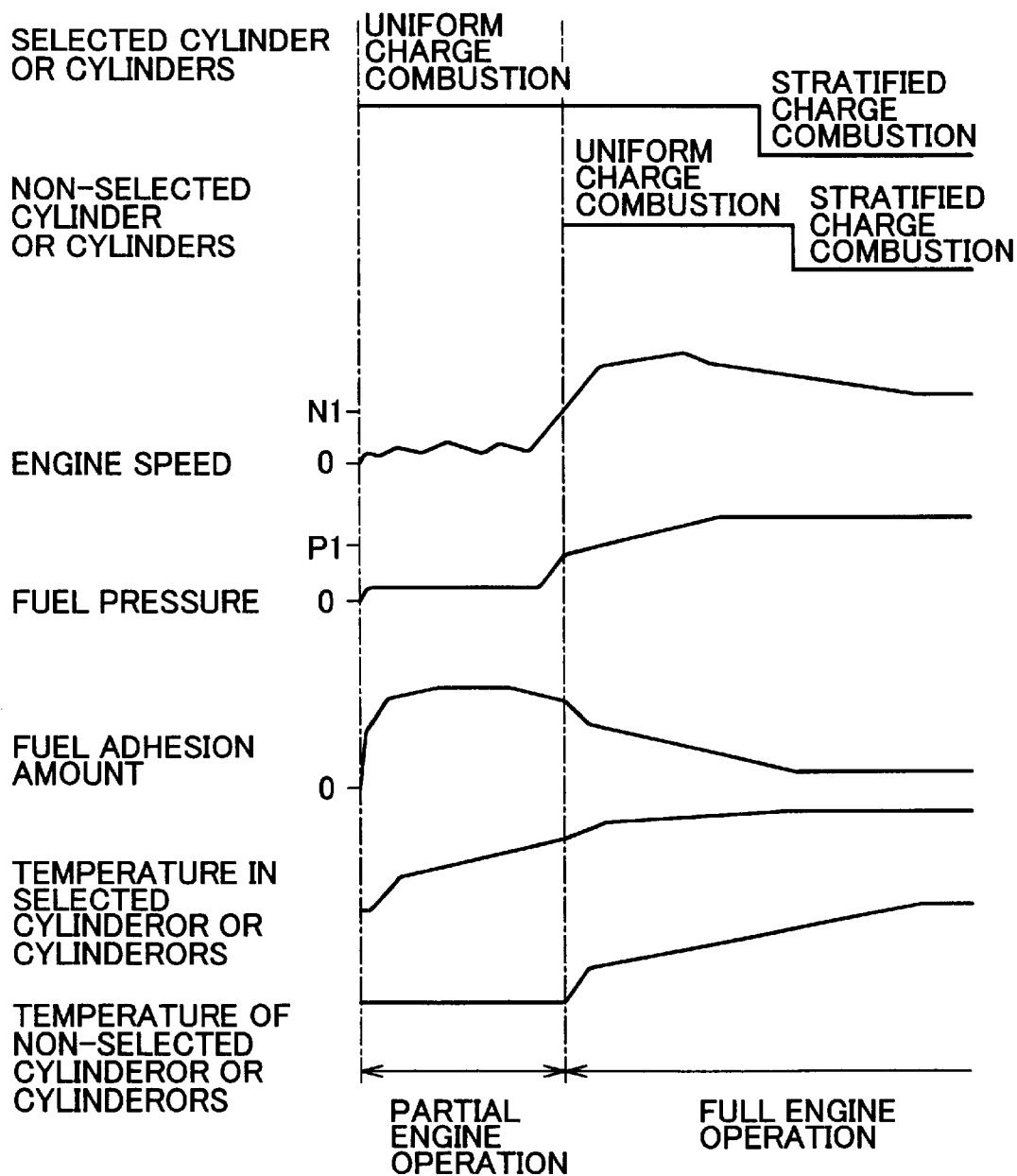
FIG. 3 is a time chart illustrating a control of the engine upon its starting according to one embodiment of this invention.

The present internal combustion engine is started as indicated by the time chart of FIG. 3. In particular, the fuel is injected into only a selected one or more of the cylinders (for example, into only one half of the total number of cylinders, more specifically, into every other cylinder as counted in the order of ignition in the normal operation of the engine) in its or their intake compression stroke, so that the engine is started with the uniform charge combustion. During the partial operation of the engine with the uniform charge combustion in the selected cylinders, the other cylinders are placed in the non-operated state, so that no amount of unburned fuel is discharged from the non-selected or non-operated cylinders. Accordingly, the amount of the unburned fuel discharged from all of the cylinders is reduced.

As a result of the partial operation of the selected cylinders, the pressure of the fuel within the fuel accumulator 5, which is initially held by the low-pressure pump at the level slightly higher than the atmospheric level, is raised to a higher level P1 by the high-pressure pump which is now driven with comparatively high stability by the engine during starting with the fuel injected into only the selected cylinders. The pressure level P1 is high enough to permit the fuel injection into each cylinder in its compression stroke. With the fuel pressure raised to P1, the engine speed is raised to N1, at which the engine starting is considered to be substantially completed, so that the engine operation with the fuel injection with all of the cylinders is initiated at this point of time.

Where the engine is started with the uniform charge combustion with the fuel injection into only the selected cylinders in their intake stroke only, or with the semi-stratified charge combustion with the fuel injection into only the selected cylinders in both of their intake and compression strokes, a portion of the fuel injected in the intake stroke remains on the cylinder bore surface and/or the piston head surface (hereinafter referred to as "combustion-chamber surface").

In the initial period of the engine starting with the fuel injection into the selected cylinders, the temperature within the selected cylinders is comparatively low, as indicated in the time chart of FIG. 3. In this state, the amount of the fuel which adheres to the combustion-chamber surface each time the fuel is injected into the combustion chamber is larger than the amount of the fuel that evaporates within the combustion chamber, so that the amount of the fuel remaining on the combustion-chamber surface increases at a relatively high rate. When the temperature within the selected cylinders has been raised to a considerably high level, the amount of the fuel that evaporates for each fuel injection becomes larger than the amount of the fuel that adheres to the combustion-chamber surface, so that the amount of the fuel remaining on the combustion-chamber surface is gradually reduced. Nevertheless, the amount of the fuel remaining on the combustion-chamber surface is comparatively large upon initiation of the engine operation with the fuel injection into all of the cylinders.

If the engine operation with the fuel injection into all of the cylinders was initiated with the stratified charge combustion initiated also within the selected cylinders, a portion of the fuel remaining on the combustion-chamber surface evaporates to form a very fuel-lean air-fuel mixture mass in the peripheral portion of the combustion chamber. Although the stratified charge combustion permits comparatively easy ignition of a highly combustible air-fuel mixture mass formed in the vicinity of the spark plug 1, a flame produced by this ignition does not propagate to the fuel-lean air-fuel mixture mass existing in the peripheral portion of the combustion chamber, so that this fuel-lean air-fuel mixture mass is discharged from the engine, without ignition, whereby the amount of the unburned fuel discharged from the engine is considerably increased.

To solve the problem indicated above, the in-cylinder-injection engine of spark ignition type is provided with a controller 100 arranged to initiate the full engine operation with the fuel injection into all cylinders when or after (i.e., not before) the fuel pressure within the fuel accumulator 5 has been raised to the predetermined level P1 high enough to permit the fuel injection into each cylinder in its compression stroke, as a result of the partial engine operation with the fuel injection into the selected cylinders, such that the uniform charge combustion within the selected cylinders is kept for a predetermined time even after the fuel pressure within the accumulator 5 has been raised to the predetermined level P1, and such that the uniform charge combustion within the selected cylinders is followed by the stratified charge combustion that is initiated when the amount of the fuel remaining on the combustion-chamber surface has decreased below an upper limit, as a result of a rise of the temperature within the selected cylinders.

The uniform charge combustion within the selected cylinders is effected with a uniform air-fuel mixture formed within the selected cylinders, so that a portion of the injected fuel remaining on the combustion-chamber surface, which evaporates and remains in the peripheral portion of each selected cylinder, merely results in a slight increase in the fuel content of the air-fuel mixture mass in the peripheral portion of each selected cylinder. This air-fuel mixture mass is readily combustible, and does not increase the amount of the unburned fuel discharged from each selected cylinder.

When the amount of evaporation of the injected fuel has sufficiently decreased as a result of a sufficient amount of decrease of the fuel remaining on the combustion-chamber surface, the stratified charge combustion is initiated within the selected cylinders. Accordingly, the amount of discharge of the unburned fuel from each selected cylinder is held within a tolerable range. Since the amount of the fuel which remains on the combustion-chamber surface and therefore the amount of evaporation of the injected fuel are particularly large in the first fuel injection or combustion into or within each selected cylinder after the initiation of the engine operation with the fuel injection into all of the cylinders, the amount of discharge of the unburned fuel from each selected cylinder is considered to be considerably larger in the first fuel combustion than in the subsequent fuel combustions. Therefore, the uniform charge combustion to be effected for at least one fuel injection after the initiation of the engine operation with the fuel injection into all of the cylinders is effective to reduce the amount of the fuel evaporation, that is, the amount of the unburned fuel, and is accordingly effective to improve the exhaust emission upon initiation of the engine operation with the fuel injection into all of the cylinders.

If the full engine operation with the fuel injection into all of the cylinders were initiated with the stratified charge combustion initiated in each of the non-selected cylinders which have been at rest, a combustible air-fuel mixture formed in the vicinity of the spark plug would be well ignited. Since the temperature within each non-selected temperature is lower than that within each selected cylinder, however, the stratified charge combustion tends to produce a comparatively large amount of smoke due to incomplete combustion of the air-fuel mixture. In view of this drawback, the internal combustion engine is controlled by controller 100 according to the present invention such that the full engine operation of all the cylinders is initiated with the uniform charge combustion also initiated within the non-selected cylinders, even if the pressure of the pressurized fluid within the fuel accumulator 5 has been raised to a level permitting the stratified charge combustion with the fuel injection in the compression stroke of each non-selected cylinder. In each non-selected cylinder, the stratified charge combustion with the fuel injection in the compression stroke is initiated after the uniform charge combustion is continued for a suitable length of time during which the temperature within each non-selected cylinder is expected to have been raised to a level at which the smoke is not produced as a result of the stratified charge combustion, and during which the amount of the fuel remaining on the combustion-chamber surface during the uniform charge combustion has sufficiently decreased as in the selected cylinders. The initial uniform charge combustion to be effected also in the non-selected cylinders makes it possible to prevent or reduce the deterioration of the exhaust emission which would otherwise arise due to the production of the smoke and the discharging of the unburned fuel during the initial portion of the full engine operation.

The situation regarding the amount of the injected fuel remaining on the combustion-chamber surface of each non-selected cylinder in relation to the temperature within the non-selected cylinder during the uniform charge combustion is similar to that of each selected cylinder in the initial portion of the engine starting with the uniform charge combustion. It is noted, however, that the degree of vacuum in the intake pipe is made relatively high even upon the first uniform charge combustion in each non-selected cylinder, as a result of the engine starting with the fuel injection into the selected cylinders, so that the fuel remaining on the combustion-chamber surface of each non-selected cylinder more easily evaporates than in the selected cylinders in the initial portion of the engine starting. Accordingly, the amount of the fuel remaining on the combustion-chamber surface of each non-selected cylinder can be sufficiently reduced at a lower temperature within each non-selected cylinder, than that in each selected cylinder, so that the stratified charge combustion within each non-selected cylinder can be initiated after a shorter period of the uniform charge combustion, than that within each selected cylinder. However, the temperature within each non-selected cylinder at the end of the comparatively short period of the uniform charge combustion may not be high enough to permit a sufficient amount of reduction of the fuel remaining on the combustion-chamber surface of each non-selected cylinder. In this respect, it is preferable to initiate the stratified charge combustion within each non-selected cylinder after the initiation of the stratified charge combustion within each selected cylinder, as indicated in the time chart of FIG. 3, rather than before the initiation of the stratified charge combustion within each selected cylinder.

Thus, the stratified charge combustion is initiated in all of the cylinders after the full engine operation with the uniform charge combustion in both of the selected and non-selected cylinders, so that the rate of consumption of the fuel in the full engine operation is reduced, while at the same time the deterioration of the exhaust emission upon initiation of the engine operation with the fuel injection into all of the cylinders can be prevented or reduced.

Commonly known internal combustion engines including the present in-cylinder-injection internal combustion engine of spark ignition type are provided with a catalytic device disposed in an exhaust system, to remove or reduce harmful components contained in the exhaust emission, for instance, a three-way catalyst device capable of oxidizing the unburned fuel to purify the exhaust emission. To reduce the amount of the unburned fuel to be discharged into the atmosphere during and immediately after the engine starting, it is effective to inject the fuel into only the selected cylinders of the engine for thereby reducing the amount of discharge of the unburned fuel and preventing or reducing the deterioration of the exhaust emission upon initiation of the full engine operation, as described above. It is also effective to efficiently warm up and activate the catalyst, for reducing the amount of discharge of the unburned fuel into the atmosphere. The activation of the catalyst permits not only reduction of the amount of discharge of the unburned fuel, but also removal or reduction of the other harmful components such as CO and NOx.

The stratified charge combustion involves formation of a combustible air-fuel mixture in the vicinity of the spark plug, which can be ignited with high stability even where the ignition timing is considerably retarded. Retardation of the ignition timing during the stratified charge combustion in both of the selected cylinders and the non-selected cylinders permits a sufficient rise of the exhaust gas temperature, and a relatively early activation of the catalyst.

Figure 4:
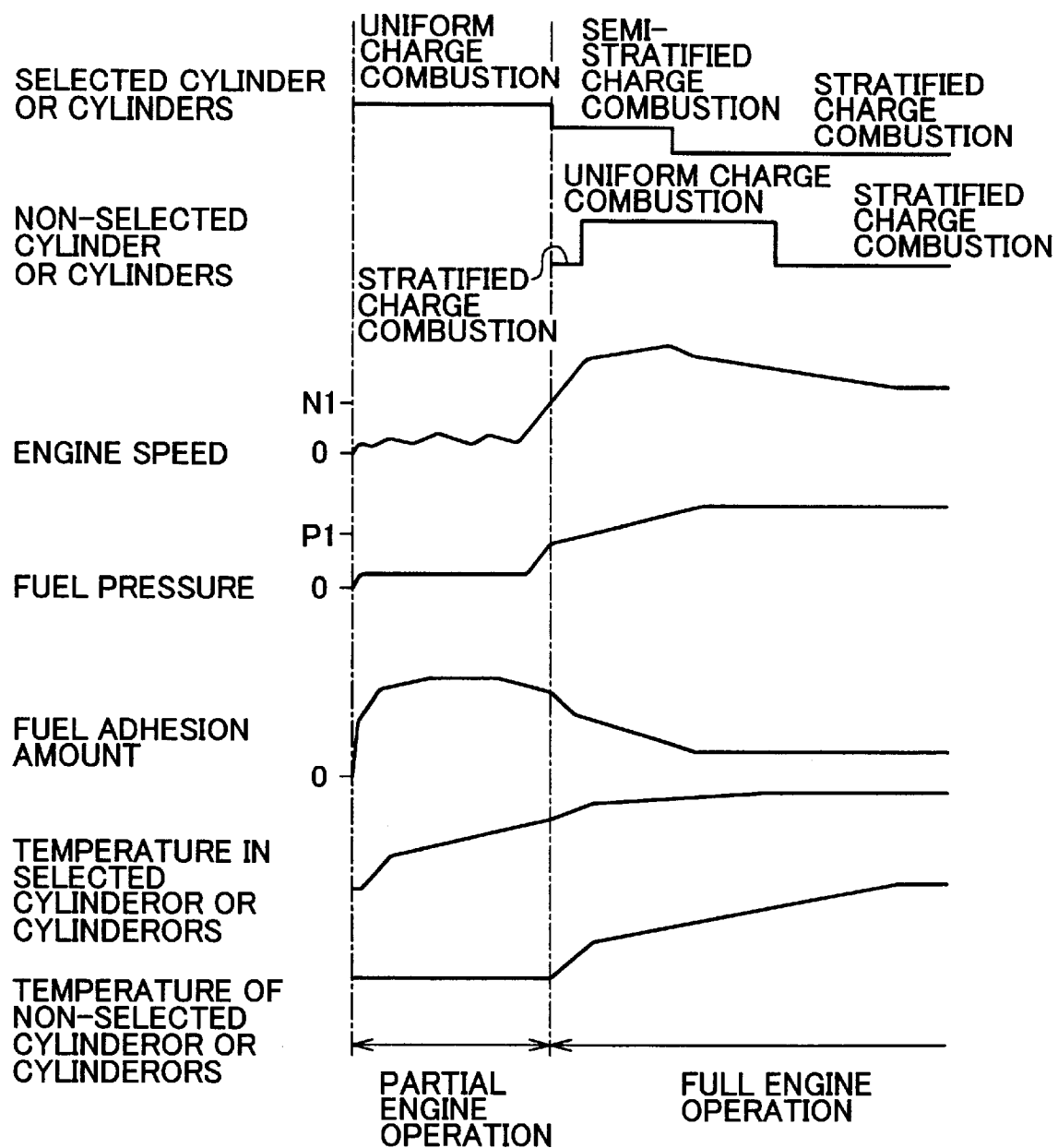
FIG. 4 is a time chart illustrating a control of the engine upon its starting according to another embodiment of this invention.

Referring next to the time chart of FIG. 4, there is illustrated a manner of controlling the in-cylinder-injection internal combustion engine of spark ignition type, according to another embodiment of this invention. There will be described only the aspects of the control illustrated in the time chart of FIG. 4 that are different from those of the time chart of FIG. 3.

In the present embodiment, a semi-stratified charge combustion is initiated within each selected cylinder upon initiation of the full engine operation. In the semi-stratified charge combustion, the fuel is injected into each selected cylinder in both of its intake and compression strokes. As described above, the semi-stratified charge combustion involves formation of a relatively fuel-lean but combustible uniform air-fuel mixture within each selected cylinder. Although a portion of the fuel remaining on the combustion-chamber surface of each selected cylinder evaporates, this gaseous portion of the fuel mixes with the uniform air-fuel mixture and is easily combustible. Accordingly, the deterioration of the exhaust emission from the selected cylinders upon initiation of the full engine operation can be prevented or reduced.

In the semi-stratified charge combustion, a portion of the required amount of fuel is injected into each selected cylinder in its compression stroke, so that the amount of fuel injected in the intake stroke is accordingly reduced, resulting in a decrease in the amount of the fuel remaining on the combustion-chamber surface. Thus, the amount of the fuel remaining on the combustion-chamber surface of each selected cylinder can be made significantly smaller in the semi-stratified charge combustion, at a relatively low temperature within each selected cylinder, than in the case where the full engine operation is initiated with the uniform charge combustion in the selected cylinders. Accordingly, the stratified charge combustion in the selected cylinders can be initiated at a relatively early point of time, further reducing the rate of consumption of the fuel in the full engine operation. Further, the retardation of the ignition timing in the stratified charge combustion can also be initiated at a relatively early point of time, permitting relatively early activation of the catalyst.

In the non-selected cylinders, at least one stratified charge combustion is effected before initiation of the uniform charge combustion. This arrangement is based on a relatively high possibility of misfiring in the first combustion in the non-selected cylinders, which misfiring results in a considerably large amount of discharge of the unburned fuel from the non-selected cylinders. The stratified charge combustion assures a high degree of stability of ignition of the air-fuel mixture, and therefore prevents the misfiring if effected as the first combustion, making it possible to avoid a risk of the unburned fuel being discharged in a considerably large amount.

The controller 100 provided for the engine of FIGS. 1 and 2 may be arranged to control the partial engine operation with the fuel injection into a selected one or more of the cylinders, in a manner different from those illustrated in the time chart of FIGS. 3 and 4. For instance, the full engine operation with the fuel injection into all of the cylinders is initiated with the uniform charge combustion in each selected cylinder, which is followed by the semi-stratified charge combustion. In this case, the stratified charge combustion in each selected cylinder is initiated when the amount of the fuel remaining on the combustion-chamber surface has sufficiently decreased. Alternatively, the full engine operation may be initiated with the semi-stratified charge combustion in each selected cylinder, which is followed by the uniform charge combustion, before initiation of the stratified charge combustion in each selected cylinder. The stratified charge combustion in each selected cylinder after initiation of the full engine operation can be preceded by a mode of combustion which involves the fuel injection into each selected cylinder in at least its intake stroke.

In the embodiment of the time chart of FIG. 3, the full engine operation is initiated with the uniform charge combustion in each non-selected cylinder. However, this uniform charge combustion may be replaced by the semi-stratified charge combustion in which the amount of production of the smoke at a relatively low temperature is smaller than in the stratified charge combustion. Alternatively, a combination of the uniform charge combustion and the semi-stratified charge combustion as discussed with respect to the selected cylinders may be employed for the non-selected cylinders. The stratified charge combustion in each non-selected cylinder after initiation of the full engine operation can be preceded by a mode of combustion which involves the fuel injection into each non-selected cylinder in at least its intake stroke.

In the embodiment of FIG. 4, the full engine operation is initiated with at least one stratified charge combustion in each non-selected cylinder, which is followed by the uniform charge combustion. However, the at least one stratified charge combustion may be replaced by the semi-stratified charge combustion which involves more highly ignitable combustion than the uniform charge combustion. The uniform charge combustion in each non-selected cylinder can be preceded by a mode of combustion which involves the fuel injection into each non-selected cylinder in at least its compression stroke.

In the embodiment of FIG. 4, the stratified charge combustion in each non-selected cylinder effected upon initiation of the full engine operation is followed by the uniform charge combustion, to prevent production of a smoke. However, this uniform charge combustion may be replaced by the semi-stratified charge combustion in which the amount of production of the smoke at a relatively low temperature is smaller than in the stratified charge combustion. Alternatively, a combination of the uniform charge combustion and the semi-stratified charge combustion as discussed with respect to the selected cylinders may be employed for the non-selected cylinders. The stratified charge combustion in each non-selected cylinder after initiation of the full engine operation can be followed by a mode of combustion which involves the fuel injection into each non-selected cylinder in at least its intake stroke.

In the two embodiments discussed above, the full engine operation is initiated when (or after) the pressure of the fuel stored in the fuel accumulator 5 has been raised to the predetermined level P1 at which the fuel can be injected into each cylinder in its compression stroke. However, the present invention is not limited to this arrangement. For example, if the operating speed of the engine is lower than a predetermined threshold when the fuel pressure has been raised to the level P1, the engine controller 100 may determine that the engine starting has not been completed, and command the engine to continue the partial operation of only the selected cylinder or cylinders. Similarly, the engine controller may determine that the engine starting has not been completed, even when the rate of increase of the engine speed by the partial engine operation is still high. In this case, the partial engine operation is continued.

That is, the engine controller may be adapted to determine the completion of the engine starting and initiate the full engine operation, when the engine speed has exceeded a predetermined threshold or when the rate of increase of the engine speed has decreased below a predetermined threshold, after the fuel pressure in the fuel accumulator 5 has been raised to the level permitting the fuel injection into each cylinder in its compression stroke, as a result of the partial engine operation.

The in-cylinder-injection internal combustion engine of spark ignition type which has been described has the cavity 4 which is formed in the top surface of the head of the piston 3, to permit the stratified charge combustion in the combustion chamber. In an in-cylinder-injection internal combustion engine of spark ignition type which is not adapted to effect the stratified charge combustion, the uniform charge combustion is effected in not only the engine operation with the fuel injection into only the selected cylinder or cylinders but also the engine operation with the fuel injection into all of the cylinders. However, misfiring in the first combustion in each non-selected cylinder can be prevented by injecting a portion of the fuel into each non-selected cylinder in the latter half of its compression stroke, for thereby improving the ignitability of the air-fuel mixture, making it possible to avoid a risk of the unburned fuel being discharged in a large amount.

In the illustrated embodiment, the controller 100 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An in-cylinder-injection internal combustion engine of spark ignition type having a plurality of cylinders, comprising:
    a fuel accumulator for storing a pressurized fuel;
    a fuel injector system that injects the pressurized fuel into each of the cylinders;
    a spark ignition system that ignites the fuel injected into each of the cylinders; and
    a controller that:
        starts the engine by a partial operation of a selected at least one of the cylinders with a fuel injected into the selected at least one of the cylinders in at least its intake stroke;
        starts a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and controls the full operation of all of the cylinders such that an initial portion of the full operation includes a first mode of combustion in the selected at least one of the cylinders with the fuel injected thereinto in at least its intake stroke, the first mode of combustion being followed by stratified charge combustion in the selected at least one of the cylinders with the fuel injected thereinto in only its compression stroke.

2. An in-cylinder-injection internal combustion engine according to claim 1, wherein the first mode of combustion is one of uniform charge combustion with the fuel injected into the selected at least one of the cylinders in only its intake stroke, and semi-stratified charge combustion with the fuel injected into the selected at least one of the cylinders in both of its intake and compression strokes.

3. An in-cylinder-injection internal combustion engine according to claim 1, wherein the full operation of all of the cylinders is initiated on a basis of an operating speed of the engine.

4. An in-cylinder-injection internal combustion engine according to claim 1, wherein the full operation of all of the cylinders is initiated at a point of time determined depending upon an operating speed of the engine.

5. An in-cylinder-injection internal combustion engine of spark ignition type having a plurality of cylinders, comprising:

a fuel accumulator for storing a pressurized fuel;

a fuel injector system that injects the pressurized fuel into each of the cylinders;

a spark ignition system that ignites the fuel injected into each of the cylinders; and a controller that:

starts the engine by a partial operation of a selected at least one of the cylinders with a fuel injected into the selected at least one of the cylinders in at least its intake stroke;

starts a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and controls the full operation of all of the cylinders such that an initial portion of the full operation includes a first mode of combustion in each of the cylinders other than the selected at least one of the cylinders with the fuel injected thereinto in at least its intake stroke, the first mode of combustion being followed by stratified charge combustion in each of the cylinders other than the selected at least one of the cylinders with the fuel injected thereinto in only its compression stroke.

6. An in-cylinder-injection internal combustion engine according to claim 5, wherein the first mode of combustion in each of the cylinders other than the selected at least one of the cylinders is preceded by at least one combustion in a second mode of combustion with the fuel injected into each of the cylinders other than the selected at least one of the cylinders in its compression stroke.

7. An in-cylinder-injection internal combustion engine according to claim 6, wherein the second mode of combustion is one of stratified charge combustion with the fuel injected into each of the cylinders other than the selected at least one of the cylinders in only its compression stroke, and semi-stratified charge combustion with the fuel injected into each of the cylinders other than the selected at least one of the cylinders in both of its intake and compression stroke.

8. An in-cylinder-injection internal combustion engine according to claim 5, wherein the first mode of combustion is one of uniform combustion with the fuel injected into each of the cylinders other than the selected at least one of the cylinders in only its intake stroke, and semi-stratified charge combustion with the fuel injected into each of the cylinders other than the selected at least one of the cylinders in both of its intake and compression strokes.

9. An in-cylinder-injection internal combustion engine according to claim 5, wherein the full operation of all of the cylinders is initiated on a basis of an operating speed of the engine.

10. An in-cylinder-injection internal combustion engine according to claim 5, wherein the full operation of all of the cylinders is initiated at a point of time determined depending upon an operating speed of the engine.

11. An in-cylinder-injection internal combustion engine of spark ignition type having a plurality of cylinders, comprising:

a fuel accumulator for storing a pressurized fuel;

a fuel injector system that injects the pressurized fuel into each of the cylinders;

a spark ignition system that ignites the fuel injected into each of the cylinders; and a controller that:

starts the engine by a partial operation of a selected at least one of the cylinders with a fuel injected into the selected at least one of the cylinders in at least its intake stroke;

starts a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and controls the full operation of all of the cylinders such that an initial portion of the full operation includes a first mode of combustion with the fuel injected into full of the cylinders in at least its intake stroke, the first mode of combustion being followed by stratified charge combustion with the fuel injected into full of the cylinders in only its compression stroke, the controller that further initiates the stratified charge combustion in the selected at least one of the cylinders earlier than in each of the cylinders other than the selected at least one of the cylinders.

12. An in-cylinder-injection internal combustion engine according to claim 11, wherein the first mode of combustion is one of uniform charge combustion with the fuel injected into full of the cylinders in only its intake stroke, and semi-stratified charge combustion with the fuel injected into full of the cylinders in both of its intake and compression strokes.

13. An in-cylinder-injection internal combustion engine according to claim 11, wherein the full operation of all of the cylinders is initiated on a basis of an operating speed of the engine.

14. An in-cylinder-injection internal combustion engine according to claim 11, wherein the full operation of all of the cylinders is initiated at a point of time determined depending upon an operating speed of the engine.

15. A method of controlling an in-cylinder-injection internal combustion engine of spark ignition type having a plurality of cylinders, comprising:

starting the engine by a partial operation of a selected at least one of the plurality of cylinders with a fuel injected into the selected at least one of the cylinders in at least its intake stroke;

initiating a full operation of all of the cylinders with the fuel injected into all of the cylinders, not before a pressure of the fuel in a fuel accumulator has been raised to a level high enough to permit injection of the fuel into each of the cylinders in its compression stroke, as a result of the partial operation of the selected at least one of the cylinders; and controlling the full operation of all of the cylinders such that an initial portion of the full operation includes a first mode of combustion in the selected at least one of the cylinders with the fuel injected thereinto in at least its intake stroke, the first mode of operation being followed by stratified charge combustion in the selected at least one of the cylinders with the fuel injected thereinto in only the compression stroke.

16. A method of controlling an in-cylinder-injection internal combustion engine of spark ignition type having a plurality of cylinders, comprising:

starting the engine by a partial operation of a selected at least one of the cylinders with a fuel injected into the selected at least one of the cylinders in at least its intake stroke;

initiating a full operation of all of the cylinders with the fuel injected into all of the cylinders, not before a pressure of the fuel in a fuel accumulator has been raised to a level high enough to permit injection of the fuel into each of the cylinders in its compression stroke, as a result of the partial operation of the selected at least one of the cylinders; and controlling the full operation of all of the cylinders such that an initial portion of the full operation includes a first mode of combustion in each of the cylinders other than the selected at least one of the cylinders with the fuel injected thereinto in at least its intake stroke, the first mode of combustion being followed by stratified charge combustion in each of the cylinders other than the selected at least one of the cylinders with the fuel injected thereinto in only its compression stroke.

17. A method of controlling an in-cylinder-injection internal combustion engine of spark ignition type having a plurality of cylinders, comprising:

starting the engine by a partial operation of a selected at least one of the cylinders with a fuel injected into the selected at least one of the cylinders in at least its intake stroke;

initiating a full operation of all of the cylinders with the fuel injected into all of the cylinders, the full operation being initiated not before a pressure of the fuel in a fuel accumulator has been raised to a level high enough to permit injection of the fuel into each of the cylinders in its compression stroke, as a result of the partial operation of the selected at least one of the cylinders; and controlling the full operation of all of the cylinders such that an initial portion of the full operation includes a first mode of combustion with the fuel injected into full of the cylinders in at least its intake stroke, the first mode of combustion being followed by stratified charge combustion with the fuel injected into full of the cylinders in only its compression stroke, wherein the stratified charge combustion in the selected at least one of the cylinders is initiated earlier than in each of the cylinders other than the selected at least one of the cylinders.

18. An in-cylinder-injection internal combustion engine of spark ignition type having a plurality of cylinders, comprising:

a fuel accumulator for storing a pressurized fuel;

a fuel injector system that injects the pressurized fuel into each of the cylinders;

a spark ignition system that ignites the fuel injected into each of the cylinders; and means for:
starting the engine by a partial operation of a selected at least one of the cylinders with a fuel injected into the selected at least one of the cylinders in at least its intake stroke;

starting a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and controlling the full operation of all of the cylinders such that an initial portion of the full operation includes a first mode of combustion in the selected at least one of the cylinders with the fuel injected thereinto in at least its intake stroke, the first mode of combustion being followed by stratified charge combustion in the selected at least one of the cylinders with the fuel injected thereinto in only its compression stroke.

19. An in-cylinder-injection internal combustion engine of spark ignition type having a plurality of cylinders, comprising:

a fuel accumulator for storing a pressurized fuel;

a fuel injector system that injects the pressurized fuel into each of the cylinders;

a spark ignition system that ignites the fuel injected into each of the cylinders; and means for that:
starting the engine by a partial operation of a selected at least one of the cylinders with a fuel injected into the selected at least one of the cylinders in at least its intake stroke;

starting a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and controlling the full operation of all of the cylinders such that an initial portion of the full operation includes a first mode of combustion in each of the cylinders other than the selected at least one of the cylinders with the fuel injected thereinto in at least its intake stroke, the first mode of combustion being followed by stratified charge combustion in each of the cylinders other than the selected at least one of the cylinders with the fuel injected thereinto in only its compression stroke.

20. An in-cylinder-injection internal combustion engine of spark ignition type having a plurality of cylinders, comprising:
- a fuel accumulator for storing a pressurized fuel;
- a fuel injector system that injects the pressurized fuel into each of the cylinders;
- a spark ignition system that ignites the fuel injected into each of the cylinders; and
- means for that:
  - starting the engine by a partial operation of a selected at least one of the cylinders with a fuel injected into the selected at least one of the cylinders in at least its intake stroke;
  - starting a full operation of all of the cylinders with the fuel injected into all of the cylinders, the full operation being initiated not before a pressure of the fuel in the fuel accumulator has been raised to a level high enough to permit injection of the fuel into each of the cylinders in its compression stroke, as a result of the partial operation of the selected at least one of the cylinders; and
  - controlling the full operation of all of the cylinders such that an initial portion of the full operation includes a first mode of combustion with the fuel injected into full of the cylinders in at least its intake stroke, the first mode of combustion being followed by stratified charge combustion with the fuel injected into full of the cylinders in only its compression stroke, the means that further initiates the stratified charge combustion in the selected at least one of the cylinders earlier than in each of the cylinders other than the selected at least one of the cylinders.

* * * * *